(12) United States Patent
Kurita et al.

(10) Patent No.: US 6,495,061 B1
(45) Date of Patent: Dec. 17, 2002

(54) REFRIGERANT FOR PROVIDING ULTRA-LOW TEMPERATURE

(75) Inventors: Susumu Kurita, c/o Dairei Co., Ltd., 19-4, Yushima 3-chome, Bunkyo-ku, Tokyo (JP); Toshio Seino, Saitama (JP); Isamu Hiruta, Saitama (JP); Makoto Morita, Saitama (JP)

(73) Assignees: Nihon Freezer Co., Ltd., Tokyo (JP); Nobuyoshi Kurita, Tokyo (JP); Dairei Co., Ltd., Tokyo (JP); Susumu Kurita, Tokyo (JP)

(*) Notice: Subject to any disclaimer, the term of this patent is extended or adjusted under 35 U.S.C. 154(b) by 0 days.

(21) Appl. No.: 09/701,878
(22) PCT Filed: Jun. 4, 1999
(86) PCT No.: PCT/JP99/02986
§ 371 (c)(1),
(2), (4) Date: Dec. 5, 2000
(87) PCT Pub. No.: WO99/64536
PCT Pub. Date: Dec. 16, 1999

(30) Foreign Application Priority Data

Jun. 6, 1998 (JP) .......................................... 10-173943

(51) Int. Cl.[7] ................................................. C09K 5/04
(52) U.S. Cl. ........................................................ 252/67
(58) Field of Search ........................................... 252/67

(56) References Cited

U.S. PATENT DOCUMENTS

| | | | |
|---|---|---|---|
| 5,049,296 A | * 9/1991 | Gu ............................... | 252/67 |
| 5,351,499 A | 10/1994 | Takemasa | |
| 5,458,798 A | 10/1995 | Lunger et al. | |
| 5,624,596 A | 4/1997 | Lunger et al. | |
| 5,670,554 A | * 9/1997 | Adams et al. ............... | 521/131 |

FOREIGN PATENT DOCUMENTS

| | | |
|---|---|---|
| JP | 4-18485 | 1/1992 |
| JP | 5-186765 | 7/1993 |
| JP | 5-287263 | 11/1993 |
| JP | 5-306391 | 11/1993 |
| JP | 7-48562 | 2/1995 |
| JP | 7-48563 | 2/1995 |
| JP | 8-41449 | 2/1996 |
| JP | 8-506581 | 7/1996 |

OTHER PUBLICATIONS

English Language Abstract of JP 5–306391. No month, date.
English Language Abstract of JP 5–186765. No month, date.
English Language Abstract of JP 7–48562. No month, date.
English Language Abstract of JP 7–48563. No month, date.
English Language Abstract of JP 4–18485. No month, date.
English Language Abstract of JP 5–287263. No month, date.
English Language Abstract of JP 8–41449. No month, date.

* cited by examiner

Primary Examiner—John Hardee
(74) Attorney, Agent, or Firm—Greenblum & Bernstein, P.L.C.

(57) ABSTRACT

A mixed refrigerant comprising one member selected from R-23, R-116 and a mixture thereof and one member selected from propane, butane and a mixture thereof. The mixed refrigerant allows cooling the inside of a freezer to a super low temperature, particularly to a temperature of −60° C. or lower, with a compressor of a conventional freezer. The mixed refrigerant not only has a low boiling point similar to those of R-23 and R-116, but also can be liquefied in a room temperature surrounding due to propane or butane contained therein, and further has good miscibility with a lubricating oil or the like so that a freezer unit using the refrigerant is free from the problem of clogging therein. Additionally, the mixed refrigerant has no ability to deplete ozone and is significantly low with respect to greenhouse effect. The refrigerant can be liquefied by a pressure within the range of practical ability of a compressor in a room temperature surrounding and allows achieving with ease a temperature inside a freezer of −60° C. or lower by means of a freezer unit using one gas and one compressor.

7 Claims, 10 Drawing Sheets

Effects Obtained upon Addition of Propane and Butane to a Refrigerant Consisting of R-23

REFRIGERANT FOR PROVIDING ULTRA-LOW TEMPERATURE

TECHNICAL FIELD

The present invention relates to a working fluid used as a refrigerant in refrigerators and for other purposes. More particularly, the present invention relates to a refrigerant for providing an ultra-low temperature which does not possess any ozone destruction capability, thereby enabling to notably inhibit the influence thereof on the atmosphere of the earth (facilitating the reduction of the 'green-house' effect), and which can be easily used at the same capacity as that of a compressor used in conventional refrigeration rooms or chambers.

BACKGROUND ART

Recently, refrigeration rooms at a ultra-low cooling temperature of less than –50° C. to –60° C., which is lower than conventional refrigeration rooms, have been used with development of the biotechnology and food transportation systems, and demand of such refrigeration rooms are increasing.

In the field of biotechnology, cells, biological tissues and other biological substances have to be stably stored for an extended time of period at the above-mentioned ultra-low temperature to ensure their good survival activity rate after thawing. To satisfy this requirement, the refrigeration rooms used for cells and other biological substances need to have highly increased refrigerating power, along with a high reliability and a low maintenance cost. Further, in order to enable biotechnology to be applied in hospitals and other institutions in addition to application in laboratories, the refrigeration rooms have to be constructed simply, at low cost; and also need to be easy to operate.

Similar problems also occur in food transportation systems etc. To maintain freshness of the food for a long period, the refrigeration rooms used in the transportation system must have high refrigerating power without any problems such as system failure, along with easy maintenance and low operation cost.

Under these circumstances, it is preferable to provide refrigeration rooms in which a refrigerant is repeatedly used in refrigeration cycles. However, refrigerants capable of providing an ultra-low cooling temperature of less than –50° C. can not be easily liquefied at room temperature, because the critical pressure thereof is generally increased with the reduction of the standard boiling point, and have a low critical temperature.

Hitherto, a refrigerator unit, based on a multistage cooling cycle, using two or more refrigerants having different boiling points has been used as a refrigerator for ultra-low temperature. Namely, by using a refrigerant having a high boiling point capable of being liquefied at room temperature for a refrigeration process that liquefies a refrigerant having a lower boiling point, an ultra-low temperature can be obtained.

A multistage cooling cycle-based refrigerator unit is illustrated in, for example, FIG. 1 in which two types of refrigerants are used and two sets of refrigerator units are operated with two compressors at two stages, respectively.

In the illustrated refrigerator room, a first refrigerant is compressed in a high temperature side-positioned compressor 1 and the gaseous compressed refrigerant is subjected to heat radiation and cooling in a high temperature side-positioned condenser 3 provided with a fan 2, thereby producing a liquefied first refrigerant. The liquefied first refrigerant is guided through a capillary tube 5 to an outer tube 11 of the double tubed heat exchanger 10. After the vaporized first refrigerant in the outer tube 11 is used to cool a second refrigerant in an inner tube 12 of the heat exchanger 10, the first refrigerant is returned to the high temperature side-positioned compressor 1. In the above process, the reference numerals 6 and 7 represent a drier and a liquid separator (accumulator), respectively.

A second refrigerant, after being compressed in a low temperature side-positioned compressor 20, is led into an inner tube 12 of the heat exchanger 10, and is cooled and liquefied with the first refrigerant. The liquefied second refrigerant is guided through a capillary tube 15 to a low temperature side-positioned evaporator 30. In the evaporator 30, the second refrigerant is vaporized under a reduced pressure to thereby cool the interior of the refrigerator room. The used second refrigerant is returned again to the compressor 20. In the above process, the reference numerals 26 and 27 represent a drier and an oil separator for removing mist-like oil, respectively.

In the above illustrated refrigeration system, it becomes possible to provide an ultra-low temperature which has a system power and capacity comparable to conventional refrigeration rooms. However, because it is constructed from two sets of refrigerators, the total size of the refrigeration system is increased and has a complicated structure, thereby causing difficulty in maintenance, substantially increasing the cost of the refrigeration room.

Alternatively, as illustrated in FIG. 2, a single compressor multicycle refrigeration system in which a mixture of two or more refrigerants having different properties such as different boiling points is used in combination with a single compressor has been researched.

In the illustrated refrigeration system, three types of refrigerants are previously mixed to obtain a mixed refrigerant. The mixed refrigerant is compressed in a compressor 40 provided with a fan 2, followed by being subjected to heat radiation in a condenser 41 to thereby liquefy a first refrigerant having the highest critical temperature.

The liquefied first refrigerant is then separated in a liquid separator 45 to remove and recover therefrom an mist-like oil contaminated by the compressor 40 and return the oil to the compressor 40. The separated first refrigerant is vaporized in a heat exchanger 50 to simultaneously cool and liquefy a gaseous second refrigerant having a lower critical temperature than that of the first refrigerant. The second refrigerant liquefied in the heat exchanger 50 is separated in a liquid separator 46 and then vaporized in a heat exchanger 51 in which a third refrigerant having the lowest critical temperature is cooled and liquefied with the vaporized second refrigerant. The third refrigerant liquefied in the heat exchanger 51 is vaporized in an evaporator 55. The thus the produced vapor of the third refrigerant is used to cool the interior of the refrigeration room to a predetermined ultra-low temperature.

In the above refrigeration system, the first to third refrigerants vaporized in the heat exchangers 50 and 51 and the evaporator 55 are returned through a common return pipe 61 to the compressor 40.

Using the illustrated refrigeration system, it becomes possible to reduce the amount of machinery utilized in the refrigeration room because only one compressor is included therein. However, contrary to this advantage, the flow circuit for circulating the three refrigerants is complicated and thus the total size of the refrigeration room is unavoidably increased along increased difficulty of the maintenance.

In addition to the improvement of the refrigeration system, an improvement of the refrigerant used as the working liquid therein has been also made. Hitherto, fluorohydrocarbons which are generally referred to as "flons" have been used as refrigerants. However, due to recent evidence proving that flon gas can cause destruction of the ozone layer adding to global warming, such flons are prohibited from being used as refrigerants. Namely, use of "specified flons" capable of causing notable ozone destruction and flons capable of adding substantially to general global warming can not be used under established regulations. Therefore, it is highly desirable to develop a novel refrigerant which has zero ozone destruction properties and a negligible effect on global warming.

At present, many types of the refrigerants which can be used without causing any adverse effect on the environment and which can show excellent properties comparable to those of the conventional flons have been proposed as an alternative to the above-described specified flons and other flons.

For example, a two component or three component refrigerant including perfluoroethane, ethane and trifluoromethane along with 1 to 10% by weight of propane and butane having a good affinity with lubricating oil has been disclosed in Japanese Unexamined Patent Publication (Kokai) No. 5-186765. This reference discloses that the return of the lubricating oil to the compressor can be accelerated with use of propane and butane, however, the cooling temperature and the pressure applied during the liquefication process is not taught.

Further, a mixed refrigerant including trifluoromethane and ethane or hexafluoromethane and ethane, and having a reduced standard boiling point of −90° C. or less has been disclosed in Japanese Unexamined Patent Publication (Kokai) No. 7-48563. However, due to a low critical temperature and a high critical pressure, the mixed refrigerant can not be used in conventionally single cycle refrigeration rooms.

Furthermore, the applicant of this application has suggested a refrigerant having an ozone destruction capability of zero level which inhibits global warming in Japanese Unexamined Patent Publication (Kokai) Nos. 5-306391 and 7-48562. JPP'391 teaches the use of a refrigerant mixture of dihydrotetrafluoroehane ($CH^2$-$FCF^3$; generally referred to as "HFC-134a" or "R-134a") and trifluoromethane ($CHF_3$; generally referred to as "HFC-23" or "R-23"), and JPP'562 teaches use of a refrigerant mixture of dihydrotetrafluoroehane (R-134a) and perfluoroethane ($C_2F_6$; generally referred to as "FC-116" or "R-116").

When additives such as propane, butane or other hydrocarbons are added to refrigerants described in JPP'391 and '562, it becomes possible to reduce the internal temperature of the refrigeration room to less than −50° C. at a discharge pressure of about 20 Kg/cm$^2$, which can be applied effectively to conventional single cycle refrigeration rooms. Therefore, the above-mentioned refrigerants can be advantageously used in refrigerators and other devices; however, to satisfy the above-described requirements for refrigeration in the field of biotechnology, food transportation systems etc., it is more desirable to provide an improved refrigerant capable of ensuring a remarkably reduced temperature of the refrigeration room which is significantly lower than −50° C.

In view of the above-described problems of the prior art refrigerants, one object of the present invention is to provide a working fluid which can ensure an ozone destruction capability of zero level and inhibited global warming properties which can achieve a satisfactory ultra-low temperature by means of conventional compressors. Particularly, the present invention is directed to provide a refrigerant which can easily realize a refrigeration ambient temperature of less than −60° C., when the refrigerant is used in the conventional single cycle refrigeration rooms.

DISCLOSURE OF INVENTION

In order to achieve the above mentioned object, there is provided a refrigerant for providing an ultra-low temperature in which the refrigerant includes trifluoromethane (CHF3), perfluoroethane ($C_2F_6$), and a conventional fuel selected from the following fuels: propane, butane, or a mixture of propane and butane.

Preferably, the trifluoromethane and the perfluoroethane are contained in a mixing ratio of 70% to 15% by weight of trifluoromethane, and 30% to 85% by weight of perfluoroethane.

Preferably, the propane is included by an amount 55% to 95% by weight, the butane is included by an amount 50% to 90% by weight, or the mixture of propane and butane is included by an amount 35% to 70% by weight.

According to another aspect of the present invention, there is provided a refrigerant for providing an ultra-low temperature, in which the refrigerant comprises trifluoromethane ($CHF_3$), propane and butane.

Preferably, the refrigerant comprises 60% to 15% by weight of trifluoromethane, 16% to 34% by weight of propane and 24% to 51% by weight of butane.

According to another aspect of the present invention, there is provided a refrigerant for providing an ultra-low temperature, in which the refrigerant comprises trifluoromethane ($CHF_3$) and butane.

Preferably, the refrigerant comprises 50% to 15% by weight of trifluoromethane and 50% to 85% by weight of butane.

According to another aspect of the-present invention, there is provided a refrigerant for providing an ultra-low temperature, in which the refrigerant comprises perfluoroethane ($C_2F_6$), propane and butane.

Preferably, the refrigerant comprises 60% to 20% by weight of perfluoroethane, 16% to 32% by weight of propane, and 24% to 48% by weight of butane.

According to another aspect of the present invention, there is provided a refrigerant for providing an ultra-low temperature, in which the refrigerant comprises perfluoroethane ($C_2F_6$) and butane.

Preferably, the refrigerant comprises 55% to 20% by weight of perfluoroethane and 45% to 80% by weight of butane.

BRIEF DESCRIPTION OF DRAWINGS

The present invention will be more clearly understood from the description as set forth below with reference to the accompanying drawings, wherein.

BEST MODE FOR CARRYING OUT THE INVENTION

Figure 1:
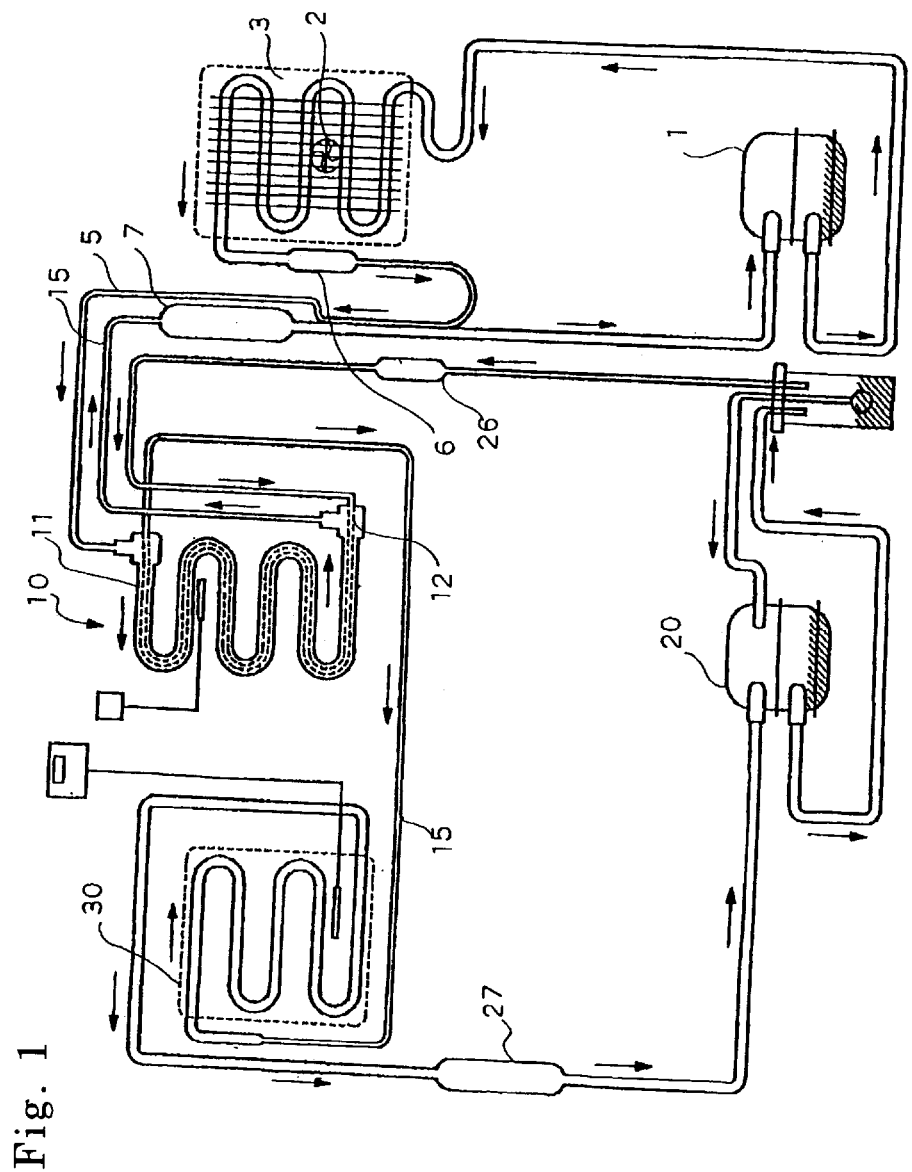
FIG. 1 is a refrigeration room of the prior art using two types of refrigerants and two sets of refrigerator units.
Figure 2:
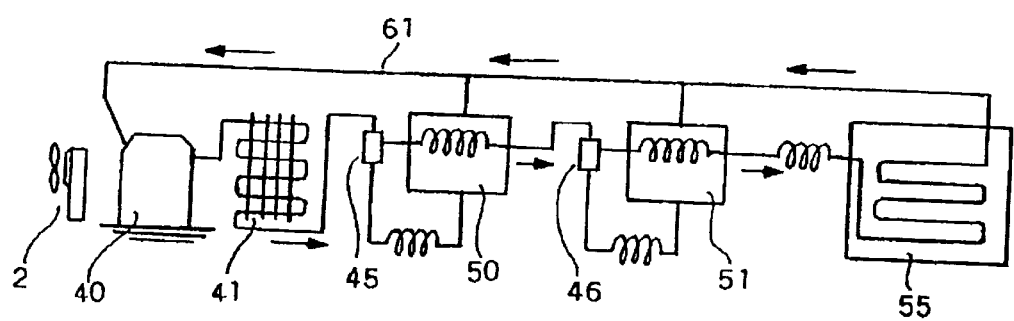
FIG. 2 is a refrigeration room of the prior art, based on a single compressor-multicycle system using three types of the mixed refrigerants.

The present invention will be further described with reference to the preferred embodiments of the present invention.

In the process of seeking a novel generation of refrigerants which show zero ozone destruction properties and prevents global warming and which can be used as an alternative to conventional chlorine-containing refrigerants or bromine-containing refrigerants such as flons and halons, the inventors of this application have found that if a refrigerant is prepared by combining a specific hydrocarbon(s) to a gas mixture consisting of trifluoromethane ($CHF_3$; R-23) and perfluoroethane ($C_2F_6$; R-116), or a sole gas of R-23 or R-116, the resulting refrigerant can maintain its boiling point at a low temperature, and the refrigerant can be liquefied at a temperature and pressure within a range of actual use.

Due to absence of chlorine atom(s) in a molecule thereof, both of R-23 and R-116 can exhibit only a negligible global warming. A gas mixture of R-23 and R-116, as is shown in the example concerning the mixing ratio of R-23 and R-116 of 39/61 in the following Table 1, can exhibit a boiling point of around −80° C., namely, it can achieve a markedly reduced temperature (i.e., ultra-low temperature). However, since it can simultaneously exhibit a notably increased vapor pressure of around 40 atm at room temperature, the gas mixture can not be applied to the conventional refrigeration rooms because of insufficient power of the installed compressor.

However, as a result of in-depth study, the inventors have surprisingly found that the gas mixture can retain its low boiling point and thus it can be liquefied at a pressure of around 20 atm at room temperature, if propane, butane or a mixture thereof is added to the gas mixture.

Propane and butane are gases which are widely used as a fuel in daily life, and thus they can be easily handled without a high level of skill. As is apparent from the properties of propane and butane summarized in the following Table 2, these gases can show a low vapor pressure at room temperature, but exhibit a high standard boiling point, and thus they can not be solely used as a refrigerant for an ultra-low temperature. However, the inventors have found that the above properties of propane and butane can be similarly realized only when they are added solely or as a gas mixture of R-23 and R-116. The inventors have also confirmed from experimentation that all the resulting refrigerants can satisfy the requirements for the properties necessary for ultra-low temperature refrigerants.

TABLE 1

| Component | Chemical formula | Boiling Point (° C., 1atm) | Critical Temp. (° C.) | Vapor Pressure (atm, 20° C.) |
|---|---|---|---|---|
| R-23 | $CHF_3$ | −82.2 | 26.15 | 49.3 |
| R-116 | $CF_3 CF_3$ | −78.2 | 19.85 | 30.4 |
| Mixture of R-23 & R-116 | R-23/R-116 = 39/61 | −85.7 | — | 41.2 |

TABLE 2

| Hydro-Carbons | Chemical Formula | Boiling Point (° C., 1atm) | Critical Temp. (° C.) | Vapor Pressure (atm, 20° C.) |
|---|---|---|---|---|
| Propane | $C_3H_8$ | −42.1 | 152.0 | 8.4 |
| Butane | $C_4H_{10}$ | −0.5 | 153.2 | 2.1 |

Generally speaking, properties such as the boiling point of the gas mixture can be represented by a continuous curve obtained by plotting a boiling point or other properties of each component constituting the gas mixture and thus the gas mixture can exhibit an intermediate property of all the constituent components. However, contrary to this, according to the inventors' findings, when specific alternative fluorocarbons, i.e., the above-described R-23, R-116 or a mixture thereof., are mixed with propane, butane or a mixture thereof to obtain a gas mixture having a predetermined composition, the resulting gas mixture can maintain a low boiling point which is inherent in R-23, R-116 or a mixture thereof, and at the same time, it can exhibit a low vapor pressure which is inherent in both propane and butane. Accordingly, as described above, the refrigerant of the present invention can ensure the specific area of the properties which are suitable for the ultra-low temperature refrigerant.

At the present stage, the reason why the described gas mixture of the present invention can strongly generate the specific property, and exact mechanism of each of the constitutional components are not yet clarified. However, it should be noted that the properties of the gas mixture having the predetermined composition obtained upon addition of propane and/or butane to R-23, R-116 or a mixture thereof can be reliably achieved, and are stable.

Accordingly, the refrigerant of the present invention formed from the above-described components can be used in any conventional refrigeration room, and can easily achieve an ultra-low temperature in such refrigeration rooms. Accordingly, no specific modification to the refrigeration rooms is required.

The refrigerant of the present invention will be further described with reference to the following experimental data.

The relationship between the compositions in which the components R-23, R-116, propane and butane are contained in different mixing ratios, and the properties as the refrigerant was evaluated in accordance with the following experiments (1) to (8) was conformed. Note that in experiments (1) to (4), the refrigerants having different compositions were prepared by combining a gas mixture of R-23 and R-116 with propane, butane or a mixture thereof. In experiments (5) to (8), the refrigerants having different compositions were prepared by combining a sole gas of R-23 or R-116 with propane, butane or a mixture thereof.

(1) Effects Obtained upon Addition of Propane and Butane to a Gas Mixture of R-23 and R-116

The refrigerants of the present invention were prepared by using a gas mixture of R-23 and R-116 (mixing ratio=39:61).

Different amounts of propane and butane were added to the gas mixture as is shown in the following Table 3 to obtain refrigerants having different compositions.

Each refrigerant was charged in the refrigeration room (refrigerating compressor commercially available from Damphos & Co.), and the compressor was operated in accordance with the conventional manner described in the operation manual to determine a temperature inside the refrigeration room (hereinafter, briefly referred to as "ambient temperature", ° C.), and a discharge pressure ($kgf/cm^2$, gauge pressure) and suction pressure ($kgf/cm^2$, absolute pressure) of the compressor. The results are summarized in the following Table 3.

TABLE 3

| No. | $C_3H_8 + C_4H_{10}$ (wt %) | Ambient Temp. (° C.) | Discharge Pressure | Suction Pressure |
| --- | --- | --- | --- | --- |
| 1 | 100 | −41 | 3.8 | 0.421 |
| 2 | 93.3 | −41 | 5.3 | 0.557 |
| 3 | 87.5 | −42 | 7.8 | 0.625 |
| 4 | 82.4 | −45 | 10.0 | 0.829 |
| 5 | 77.8 | −50 | 12.0 | 0.897 |
| 6 | 73.7 | −52 | 14.0 | 1.033 |
| 7 | 70.0 | −58 | 16.0 | 1.133 |
| 8 | 68.9 | −68 | 20.0 | 1.383 |
| 9 | 63.3 | −73 | 18.8 | 1.583 |
| 10 | 60.8 | −75 | 20.0 | 1.433 |
| 11 | 59.6 | −74 | 17.8 | 1.433 |
| 12 | 54.4 | −75 | 19.0 | 1.383 |
| 13 | 40.0(B) | −33 | 25.0 | 1.533 |
| 14 | 38.9(A) | −73 | 19.5 | 1.733 |
| 15 | 37.8(A) | −71 | 20.0 | 1.833 |
| 16 | 36.8(A) | −71 | 21.0 | 1.833 |
| 17 | 35.9(A) | −66 | 24.1 | 2.233 |
| 18 | 30.0(B) | −27 | 26.0 | 1.733 |
| 19 | 20.0(B) | −17 | 28.0 | 1.833 |
| 20 | 10.0(B) | −12 | 30.0 | 2.033 |
| 21 | 0.0 | −85.7 (b.p.) | 41.2 (vapor press.) | — |

Note:
Room Temperature: 20° C.
Discharge Pressure: Gauge Pressure ($kgf/cm^2$)
Vacuum: Absolute Pressure ($kgf/cm^2$)
R-23/R-116 = 39/61
$C_3H_8/C_4H_{10}$ = 25/75 except for Nos. 2 to 7: $C_3H_8/C_4H_{10}$ = 15.5/139.5 − 140/15
Total of Charged Gases: 150 to 285 g except for (A): 360 to 390 g, (B): 210 g (constant)

In Table 3, for reference, the ambient temperature and discharge pressure of the refrigerant No.21 containing no propane and butane (0 wt %) are described with reference to the boiling point and the vapor pressure at the room temperature of the gas mixture of R-23 (39 wt %) and R-116 (61 wt %), respectively. The results of Table 3 are also plotted in FIG. 3.

Figure 3:
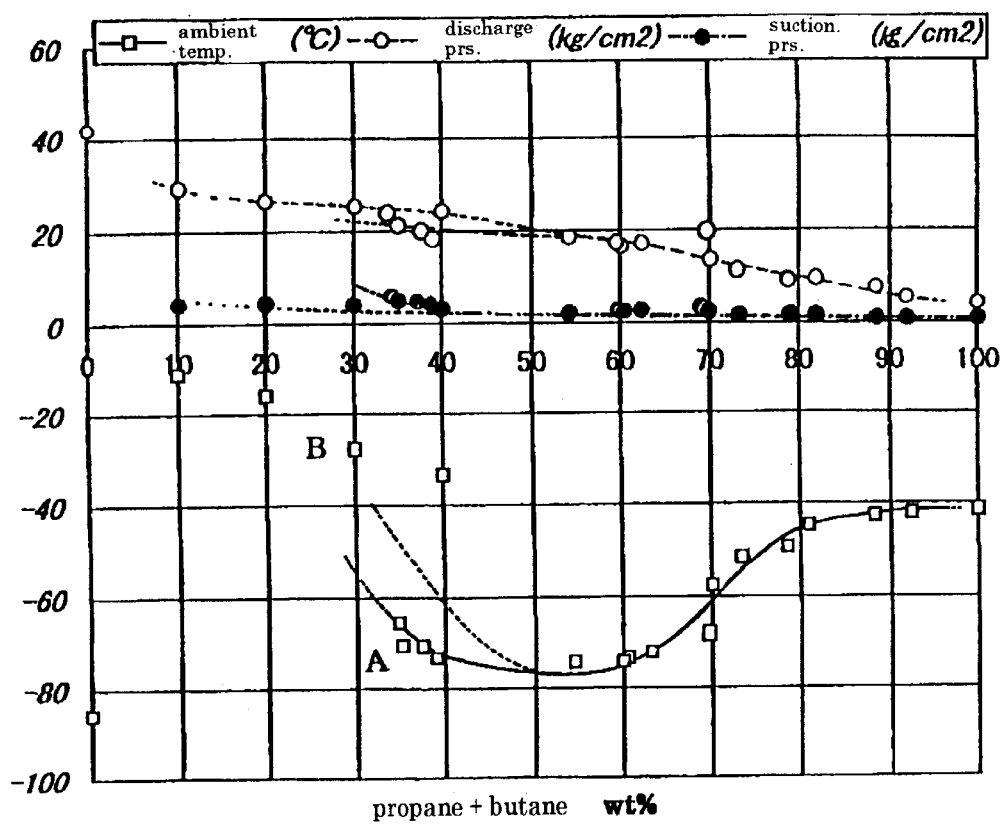
FIG. 3 is a graph showing the effect of addition of propane and butane to a gas mixture of R-23 and R-116.

As can be appreciated from FIG. 3, when a mixture of propane and butane were mixed in a mixing ratio of 35 to 70% by weight to a gas mixture of R-23 and R-116, the ambient temperature could be maintained at a range of −60 to −75° C., and the refrigerating compressor could be operated at a discharge pressure of around 15 to 25 $kgf/cm^2$ at an outlet of the compressor.

Further, when a mixing ratio of propane/butane mixture was changed to a range of 35% to 65% by weight, an ambient temperature of less than −70° C. could be achieved at a relatively low discharge pressure of 18 to 22 $kgf/cm^2$.

Furthermore, the refrigerants satisfying the above-mentioned requirements of the composition have good compatibility with lubricating oil and therefore they do not cause any problems due to clogging, when the above experiments are repeated.

When a mixing ratio of propane/butane mixture to the gas mixture is increased beyond an upper limit of the described composition range as indicated in FIG. 3, the ambient temperature is suddenly increased to end at around −41° C., while the discharge pressure is gradually reduced. Conversely, when a mixing ratio of propane/butane mixture to the gas mixture is reduced, the refrigeration process becomes sensitive to the amount and composition of the charged gases at a mixing ratio of around 40% by weight, and therefore notable differences in the cooling power can be produced along with an increase of pressure, depending upon these operation conditions.

FIG. 3 includes the results classified under Group (A) and Group (B).

The Group (A) shows the results obtained at a total amount of charged gases of 360 g to 390 g when the ambient temperature is maintained at the temperature as low as possible. Even if the mixing ratio is reduced to 40% by weight or less, the ambient temperature can be maintained at the substantially same temperature of about −70° C. However, when the mixing ratio is further reduced to about 35% by weight, overcharging of the gases is caused, thus both of the discharge pressure and the ambient temperature are increased to the level which does not ensure a sufficient cooling power.

When the refrigerating compressor was operated at a total amount of charged gases of 210 g (constant), shown as Group (B) in FIG. 3, the mixing ratio of 40% by weight or less resulted in an ambient temperature of greater than −40° C., i.e., remarkably reduced cooling power. This result indicates that the liquefication of R-23 and R-116 can not be proceeded under operation conditions including the described total amount of charged gases.

(2) Effects Obtained upon Addition of Propane and Butane to a Gas Mixture of R-23 and R-116 Having Different Mixing Ratios The procedure of the above experiment (1) was repeated to confirm that the refrigerant can achieve excellent properties described above, within a wide range of the mixing ratios of R-23 and R-116, a mixing ratio of propane and butane was adjusted to a predetermined ratio of 25:75, but a mixing ratio of R-23 and R-116 was varied as shown in the following Table 4. The results are summarized in the following Table 4.

TABLE 4

| No. | R-116 (wt %) | Ambient Temp. (° C.) | Discharge Pressure | Suction Pressure |
| --- | --- | --- | --- | --- |
| 1 | 30 | −59 | 27.0 | 0.877 |
| 2 | 40 | −64 | 26.4 | 0.884 |
| 3 | 50 | −73 | 23.4 | 1.733 |
| 4 | 70 | −70 | 23.0 | 1.583 |
| 5 | 80 | −68 | 21.8 | 1.483 |
| 6 | 90 | −55 | 21.0 | 1.483 |

Figure 4:
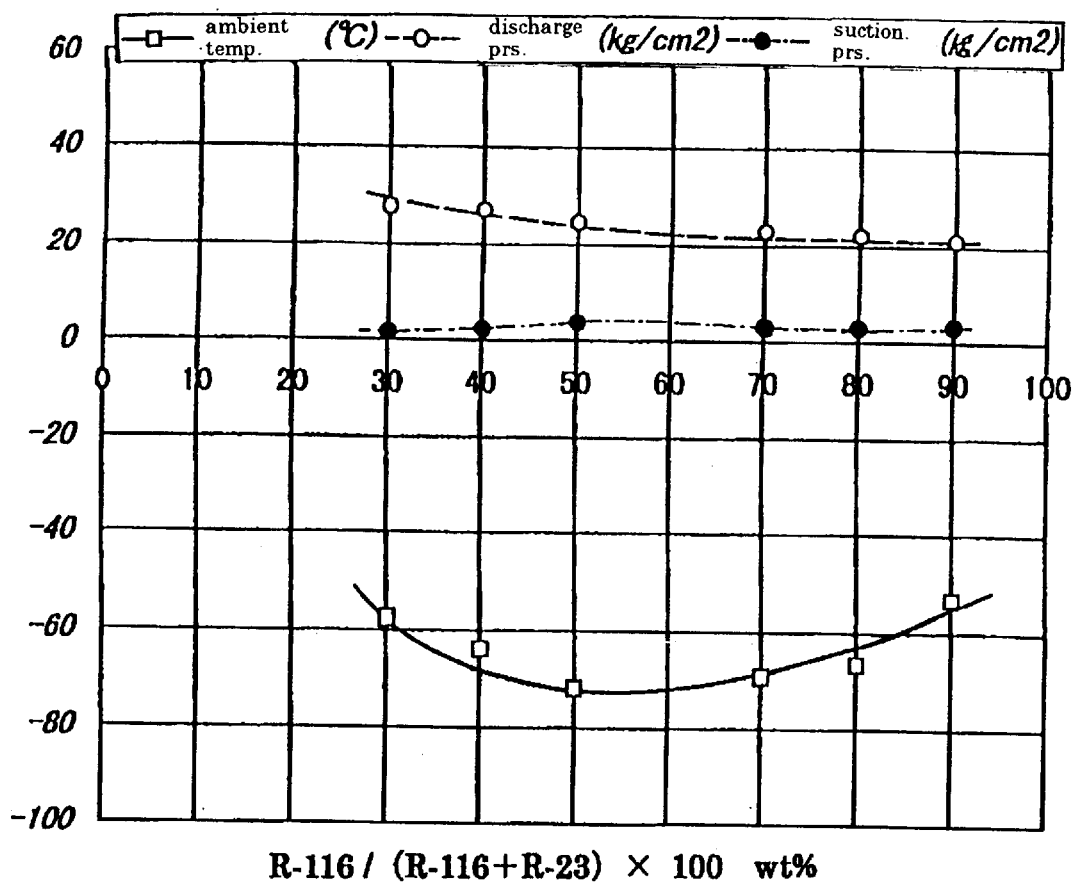
FIG. 4 is a graph showing the effect of addition of propane and butane to a gas mixture of R-23 and R-116 having different mixing ratios.

Note:
Room Temperature: 20° C.
Discharge Pressure: Gauge Pressure ($kgf/cm^2$)
Vacuum: Absolute Pressure ($kgf/cm^2$)
R-116 (wt %): R-116/(R-23 + R-116) × 100 (wt %)
$C_3H_8/C_4H_{10}$ = 25/75 (constant)
(R-23 + R-116)/($C_3H_8 + C_{410}$) = 50/50
Total of Charged Gases: 210 g The results of Table 4 are also plotted in FIG. 4. As can be appreciated from FIG. 4, an ambient temperature of about −60 to −73° C. can be maintained and also the compressor can be operated at a discharge pressure of not more than 26 kgf/cm², when a mixing ratio of R-116 in R-23 and R-116 is in the range of about 30 to 85 wt % (70 to 15 wt % for R-23), and in particular, a mixing ratio of R-23 and R-116 is around 50% by weight.

When the mixing ratio of R-23 and R-116 is increased above or reduced below the range of the mixing ratio, the ambient temperature can be increased in both of the R-23-rich area and R-116-rich area, and the discharge pressure shows a tendency of being increased at the area of the R-116 content of less than 50% by weight.

The above results indicate that according to the present invention, excellent functions and effects can be obtained in a relatively wide range of the mixing ratio of R-23 and R-116, and the ambient temperature of −60 to −70° C. can be achieved when R-116 is used in the above mentioned range of mixing ratio, however, if it is desired to maintain the discharge pressure at a low level, R-116 is preferably used in a mixing ratio of more than 50%.

In particular, when R-116 is used in a mixing ratio of 45% to 65% by weight, an ambient temperature of less than −70° C. can be retained at the discharge pressure of 23 kgf/cm².

(3) Effects Obtained upon Sole Addition of Propane to a Gas Mixture of R-23 and R-116

The procedure of the above experiment (1) was repeated, to confirm the effects obtained when the refrigerant of the present invention is prepared by mixing a gas mixture of R-23 and R-116 with propane alone, a mixing ratio of R-23 and R-116 was adjusted to a predetermined ratio of 39:61. However, a mixing ratio of propane to the gas mixture of R-23 and R-116 was varied as shown in the following Table 5. The results are summarized in the following Table 5.

TABLE 5

| No. | Propane (wt %) | Ambient Temp. (° C.) | Discharge Pressure | Suction Pressure |
| --- | --- | --- | --- | --- |
| 1 | 10 | −2 | 30.0 | 0.897 |
| 2 | 50 | −51 | 24.8 | 1.633 |
| 3 | 80 | −67 | 14.4 | 1.233 |
| 4 | 90 | −65 | 14.0 | 1.233 |

Figure 5:
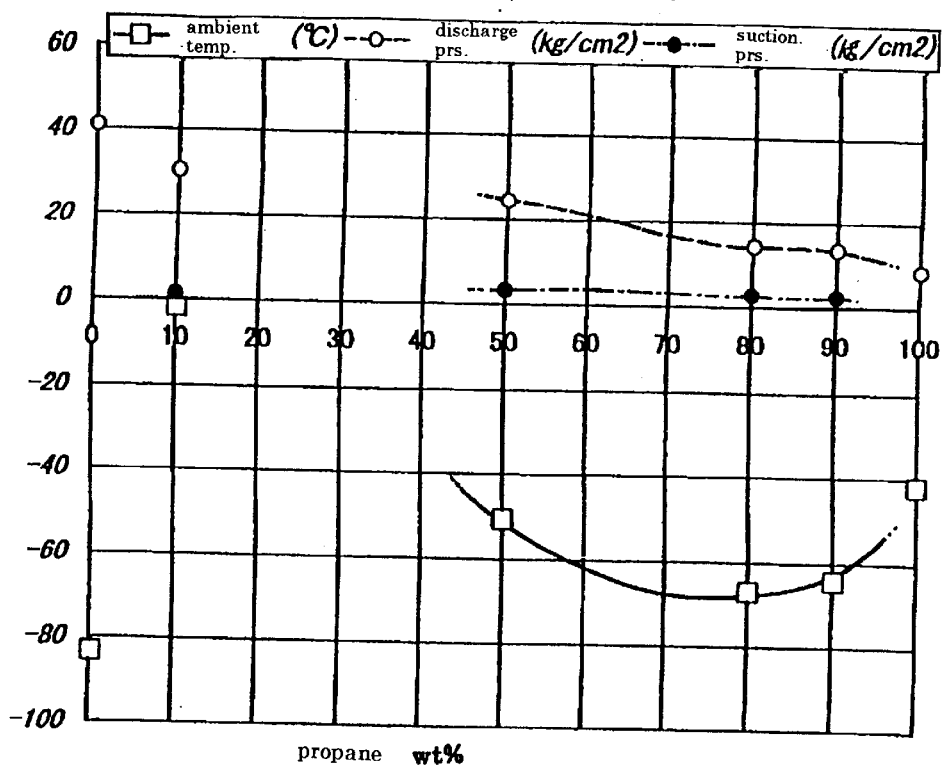
FIG. 5 is a graph showing the effect obtained upon the sole addition of propane to a gas mixture of R-23 and R-116.

Note:
Room Temperature: 20° C.
Discharge pressure: gauge pressure (kgf/cm²)
Vacuum: absolute pressure (kgf/cm²)
R-23/R-116 = 39/61 (constant)
Total of charged gases: 210 g The results of Table 5 are also plotted in FIG. 5. In FIG. 5, for reference, the ambient temperature and discharge pressure of the refrigerants containing no (0 wt %) propane and containing 100% by weight of propane are plotted with reference to the boiling point and the vapor pressure at room temperature of the gas mixture of R-23 (39 wt %) and R-116 (61 wt %), and propane alone, respectively.

As can be appreciated from FIG. 5, the ambient temperature is suddenly reduced immediately after a mixing ratio of propane to the gas mixture of R-23 and R-116 is reduced at the area near to the propane content of 90% by weight, while a discharge pressure is retained at a relatively low level. Further, when the mixing ratio of propane is reduced to 50% by weight or less, the operation of the refrigerator unit becomes instable so that a constant ambient temperature can not be obtained.

The above results indicate that the refrigerator can be operated at a constantly maintained ambient temperature of about −60 to −67° C. and with a discharge pressure of about 13 to 22 kgf/cm², if propane is mixed in a mixing ratio of 55 to 95% by weight to a gas mixture of R-23 and R-116.

In particular, the above refrigerant is suitable as a refrigerant capable of achieving an ambient temperature of less than −65° C. under the operation conditions of the propane mixing ratio of 65% to 85% by weight and the discharge pressure of not more than 20 kgf/cm².

(4) Effects Obtained upon Sole Addition of Butane to a Gas Mixture of R-23 and R-116

The procedure of the above experiment (1) was repeated to confirm the effects obtained when the refrigerant of the present invention is prepared by mixing a gas mixture of R-23 and R-116 with butane alone. A mixing ratio of R-23 and R-116 was adjusted to a predetermined ratio of 39:61. However, a mixing ratio of butane to the gas mixture of R-23 and R-116 was varied as is shown in the following Table 6. The results are summarized in the following Table 6.

TABLE 6

| No. | Butane (wt %) | Ambient Temp. (° C.) | Discharge Pressure | Suction Pressure |
| --- | --- | --- | --- | --- |
| 1 | 50 | −29 | 19.0 | 1.333 |
| 2 | 80 | −38 | 9.5 | 0.625 |
| 3 | 90 | −32 | 6.0 | 0.557 |

Figure 6:
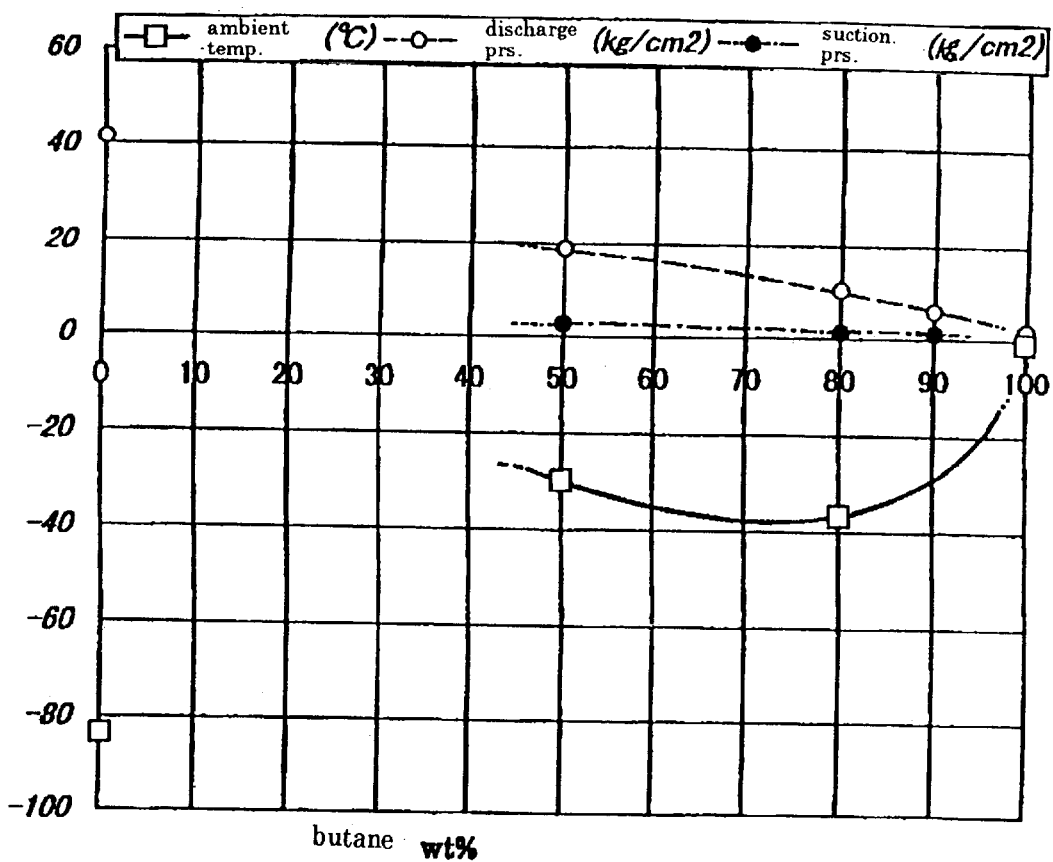
FIG. 6 is a graph showing the effect obtained upon the sole addition of butane to a gas mixture of R-23 and R-116.

Note:
Room Temperature: 20° C.
Discharge Pressure: Gauge Pressure (kgf/cm²)
Vacuum: Absolute Pressure (kgf/cm²)
R-23/R-116 = 39/61 (constant)
Total of Charged Gases: 210 g The results of Table 6 are also plotted in FIG. 6. In FIG. 6, for reference, the ambient temperature and discharge pressure of the refrigerants containing no (0 wt %) butane and containing 100% by weight of butane are plotted with reference to the boiling point and the vapor pressure at the room temperature of the gas mixture of R-23 (39 wt %) and R-116 (61 wt %), and butane alone, respectively.

As can be appreciated from FIG. 6, the ambient temperature is suddenly reduced immediately after a mixing ratio of butane to the gas mixture of R-23 and R-116 is reduced at the area near to the butane content of 90% by weight, while an increase of the discharge pressure is moderate and thus the pressure is retained at a relatively low level. Namely, the above tendency is similar to that of experiment (3) using propane alone. Further, when the mixing ratio of butane is reduced to 50% by weight or less, the operation of the refrigerator unit becomes instable so that a constant ambient temperature can not be obtained.

In addition, it is also appreciated from FIG. 6 that the ambient temperature of −30° C. to −40° C. can be obtained when a mixing ratio of butane is in the range of 50% to 90% by weight, and at the same time, a low discharge pressure of 6.0 to 19 kgf/cm² can be obtained. It is therefore considered that the refrigerant having the above composition can be advantageously used for refrigerators which do not require notably reduced refrigeration temperature, as refrigerators using this refrigerant can be operated with a small load.

Also, the above refrigerant is suitable as a refrigerant capable of achieving an ambient temperature of not higher than −35° C. under the discharge pressure of less than 15 kgf/cm² in the butane mixing ratio of 60 to 80% by weight.

(5) Effects Obtained upon Addition of Propane and Butane to a Refrigerant Consisting of R-23

To confirm the properties of the refrigerant according to the present invention consisting of R-23 and a mixture of propane and butane, R-23 was mixed with a mixture of propane and butane (mixing ratio =40:60). Different amounts of propane and butane were added to R-23 as shown in the following Table 7 to obtain the refrigerants having different compositions.

Each refrigerant was charged in the refrigeration room (refrigerating compressor commercially available from Damphos & Co.), and the compressor was operated in accordance with the conventional manner described in the operation manual to determine an ambient temperature (° C.), and a discharge pressure (kgf/cm$^2$, gauge pressure) and vacuum (kgf/cm$^2$, absolute pressure) of the compressor. The results are summarized in the following Table 7.

TABLE 7

| No. | $C_3H_8 + C_4H_{10}$ (wt %) | Ambient Temp. (° C.) | Discharge Pressure | Suction Pressure |
|---|---|---|---|---|
| 1 | 82.4 | −60 | 17.0 | 0.000 |
| 2 | 81.3 | −63 | 19.5 | 0.001 |
| 3 | 80.0 | −63 | 22.0 | 0.001 |
| 4 | 78.6 | −61 | 23.0 | 0.003 |
| 5 | 77.8 | −75 | 17.5 | 0.001 |
| 6 | 76.5 | −70 | 21.8 | 0.004 |
| 7 | 65.0 | −72 | 19.0 | 0.003 |
| 8 | 61.9 | −72 | 18.5 | 0.003 |
| 9 | 59.1 | −72 | 19.5 | 0.003 |
| 10 | 40.0 | −65 | 23.0 | 0.003 |

Figure 7:
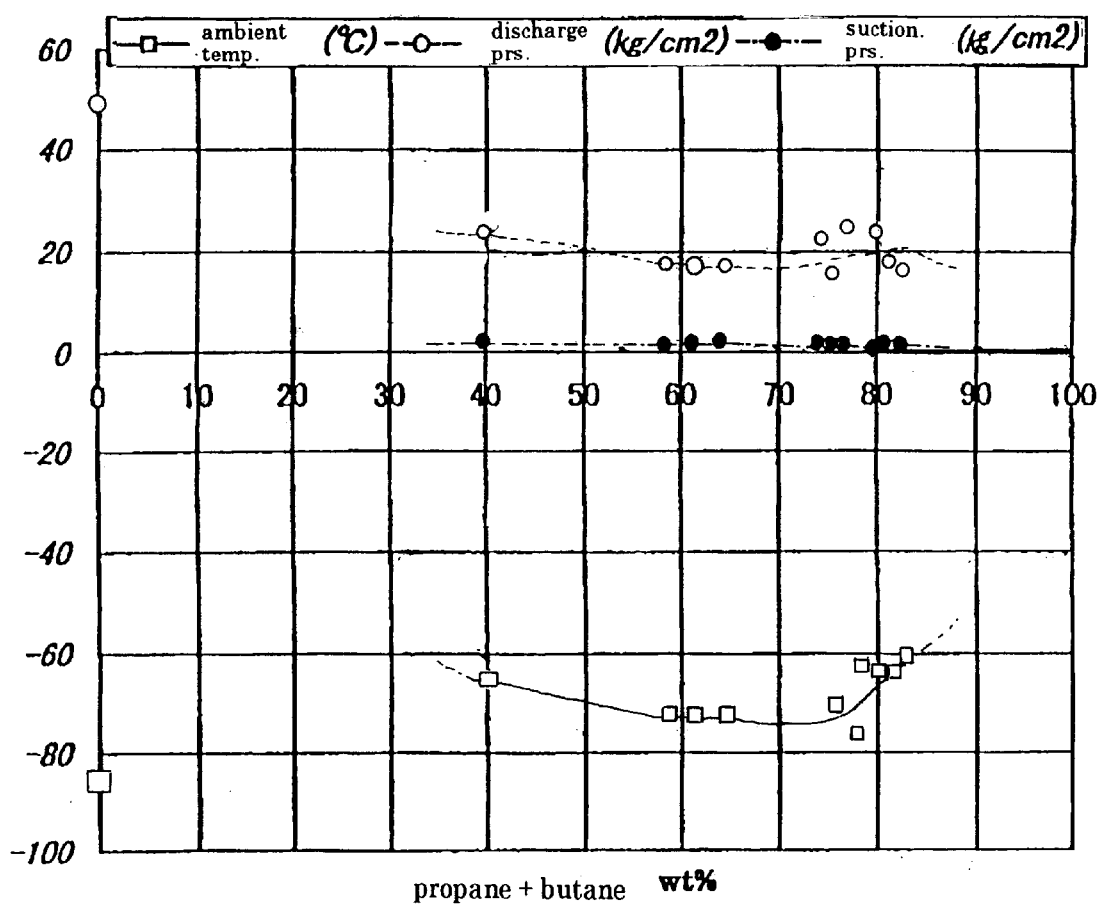
FIG. 7 is a graph showing the effect obtained upon addition of propane and butane to a refrigerant consisting of R-23.

Note:
Room Temperature: 28° C.
Discharge Pressure: Gauge Pressure (kgf/cm$^2$)
Vacuum: Absolute Pressure (kgf/cm$^2$)
$C_3H_8/C_4H_{10}$ = 40/60
Total of Charged Gases: 140 to 220 g The results of Table 7 are also plotted in FIG. 7. In FIG. 7, for the reference, the ambient temperature and discharge pressure of the refrigerant containing no (0 wt %) mixture of propane and butane are plotted with reference to the boiling point and the vapor pressure at the room temperature of R-23.

As can be appreciated from FIG. 7, when a mixture of propane and butane were mixed in a mixing ratio of 40 to 85% by weight (16 to 34% by weight of propane and 24 to 51% by weight of butane) to R-23, a mixing ratio of R-23 being in a range of 60 to 15% by weight, the ambient temperature could be maintained at −60° C. or less, and the refrigerating compressor could be operated at a discharge pressure of around 17.0 to 23.0 kgf/cm$^2$ in an outlet of the compressor.

(6) Effects Obtained upon Addition of Propane and Butane to a Refrigerant Consisting of R-116

The procedure of the above experiment (5) was repeated to confirm the properties of the refrigerant consisting of R-116 and a mixture of propane and butane; R-116 was mixed with a mixture of propane and butane (mixing ratio= 40:60). Different amounts of propane and butane were added to R-116 as shown in the following Table 8 to obtain the refrigerants having different compositions. The results are summarized in the following Table 8.

TABLE 8

| No. | $C_3H_8 + C_4H_{10}$ (wt %) | Ambient Temp. (° C.) | Discharge Pressure | Suction Pressure |
|---|---|---|---|---|
| 1 | 88.2 | −52 | 8.5 | 0.340 |
| 2 | 83.3 | −58 | 10.0 | 0.272 |

TABLE 8-continued

| No. | $C_3H_8 + C_4H_{10}$ (wt %) | Ambient Temp. (° C.) | Discharge Pressure | Suction Pressure |
|---|---|---|---|---|
| 3 | 78.9 | −66 | 12.0 | 0.204 |
| 4 | 75.0 | −68 | 13.0 | 0.000 |
| 5 | 73.7 | −63 | 14.0 | 0.068 |
| 6 | 70.0 | −65 | 15.0 | 0.000 |
| 7 | 68.4 | −66 | 14.8 | 0.068 |
| 8 | 65.0 | −68 | 15.0 | 0.000 |
| 9 | 63.2 | −58 | 18.4 | 0.068 |
| 10 | 61.1 | −63 | 18.2 | 0.000 |
| 11 | 57.9 | −65 | 19.2 | 0.001 |
| 12 | 55.0 | −67 | 19.5 | 0.001 |
| 13 | 52.4 | −69 | 19.0 | 0.001 |
| 14 | 50.0 | −69 | 18.0 | 0.001 |
| 15 | 47.8 | −68 | 20.0 | 0.001 |
| 16 | 40.0 | −65 | 25.0 | 0.001 |

Note:
Room Temperature: Gauge Pressure (kgf/cm$^2$)
vacuum: absolute pressure (kgf/cm$^2$)
$C_3H_8/C_4H_{10}$ = 40/60

Total of Charged Gases: 190 to 250 g

Figure 8:
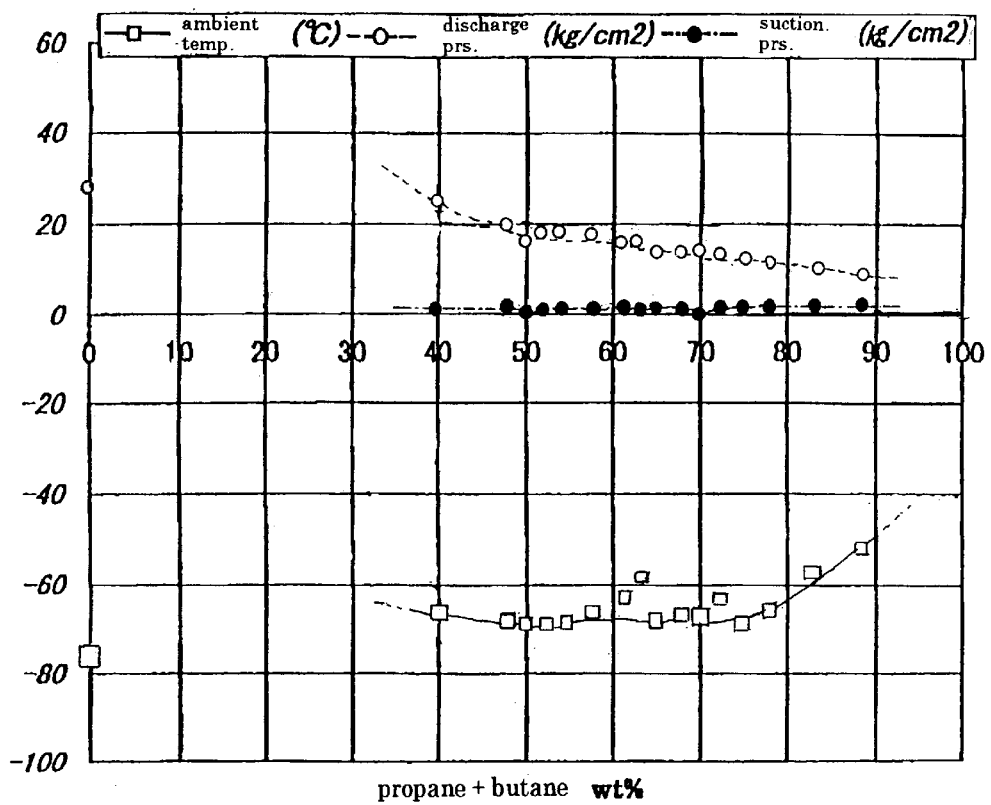
FIG. 8 is a graph showing the effect obtained upon addition of propane and butane to a refrigerant consisting of R-116.

The results of Table 8 are also plotted in FIG. 8. In FIG. 8, for reference, the ambient temperature and discharge pressure of the refrigerant containing no (0 wt %) mixture of propane and butane are plotted with reference to the boiling point and the vapor pressure at the room temperature of R-116.

As can be appreciated from FIG. 8, when a mixture of propane and butane were mixed in a mixing ratio of 40 to 80% by weight (16 to 32% by weight of propane and 24 to 48% by weight of butane) to R-116, a mixing ratio of R-116 being in a range of 60 to 20% by weight, the ambient temperature could be maintained at −60° C. or less, and the refrigerating compressor could be operated at a discharge pressure of 12.0 to 25.0 kgf/cm$^2$ in an outlet of the compressor.

(7) Effects Obtained upon Addition of Butane to a Refrigerant Consisting of R-23

The procedure of the above experiment (5) was repeated to confirm the properties of the refrigerant consisting of R-23 and butane, R-23 was mixed with different amounts of butane, shown in the following Table 9, to obtain the refrigerants having different compositions. The results are summarized in the following Table 9.

TABLE 9

| No. | Butane (wt %) | Ambient Temp. (° C.) | Discharge Pressure | Suction Pressure |
|---|---|---|---|---|
| 1 | 88.9 | −51 | 13.5 | 0.068 |
| 2 | 83.3 | −69 | 18.6 | 0.002 |
| 3 | 78.9 | −72 | 20.0 | 0.003 |
| 4 | 75.0 | −74 | 19.0 | 0.001 |
| 5 | 71.4 | −75 | 17.9 | 0.001 |
| 6 | 65.1 | −74 | 17.2 | 0.001 |
| 7 | 60.0 | −74 | 21.0 | 0.004 |
| 8 | 50.0 | −60 | 22.5 | 0.003 |

Figure 9:
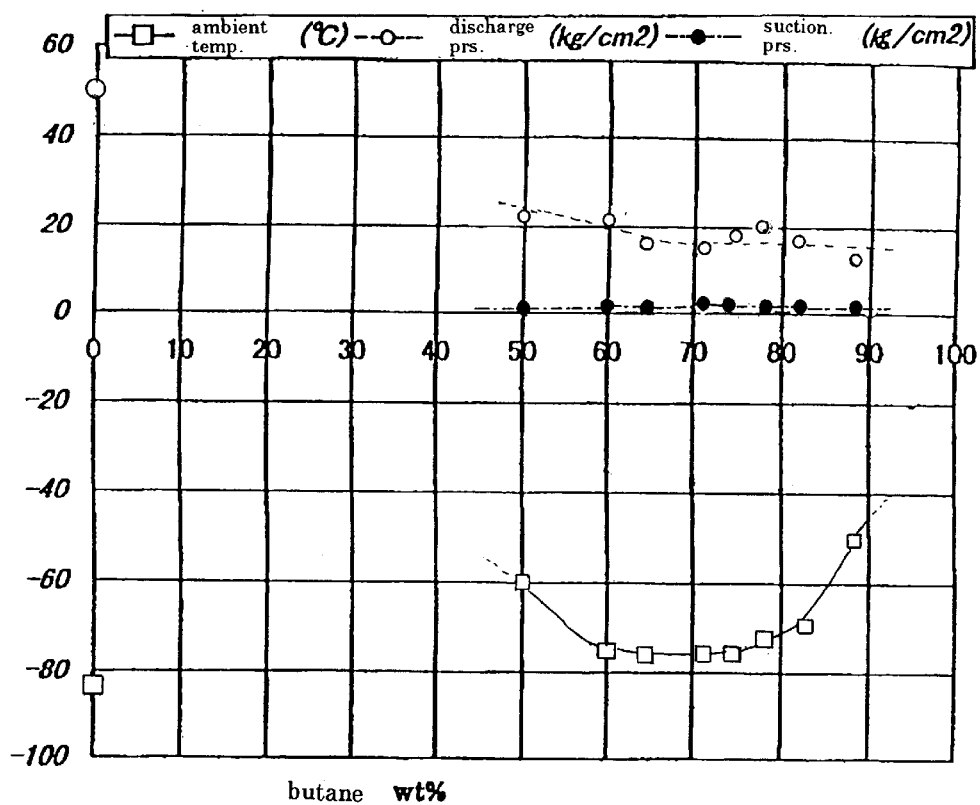
FIG. 9 is a graph showing the effect obtained upon sole addition of butane to a refrigerant consisting of R-23.

Note:
Room Temperatute: 28° C.
Discharge Pressure: Gauge Pressure (kgf/cm$^2$)
Vacuum: Absolute Pressure (kgf/cm$^2$)
Total of Charged Gases: 190 to 230 g The results of Table 9 are also plotted in FIG. 9. In FIG. 9, for reference, the ambient temperature and discharge pressure of the refrigerant containing no (0 wt %) butane are plotted with reference to the boiling point and the vapor pressure at the room temperature of R-23.

As can be appreciated from FIG. 9, when butane was mixed in a mixing ratio of 50 to 85% by weight and thus R-23 was mixed in a mixing ratio of 50 to 15% by weight, the ambient temperature could be maintained at −60° C. or less, and the refrigerating compressor could be operated at a discharge pressure of 17.2 to 21.0 kgf/cm$^2$ in an outlet of the compressor.

(8) Effects Obtained upon Addition of Butane to a Refrigerant Consisting of R-116

The procedure of the above experiment (5) was repeated to confirm the properties of the refrigerant according to the present invention consisting of R-116 and butane, R-116 was mixed with different amounts of butane, shown in the following Table 10, to obtain the refrigerants having different compositions. The results are summarized in the following Table 10.

TABLE 10

| No. | Butane (wt %) | Ambient Temp. (° C.) | Discharge Pressure | Suction Pressure |
|---|---|---|---|---|
| 1 | 80.0 | −60 | 12.5 | 0.272 |
| 2 | 73.7 | −63 | 12.8 | 0.204 |
| 3 | 72.7 | −63 | 15.0 | 0.000 |
| 4 | 71.4 | −65 | 15.0 | 0.136 |
| 5 | 70.0 | −69 | 15.0 | 0.068 |
| 6 | 68.4 | −60 | 16.0 | 0.204 |
| 7 | 66.7 | −72 | 15.3 | 0.027 |
| 8 | 65.2 | −76 | 15.5 | 0.041 |
| 9 | 63.6 | −68 | 15.8 | 0.000 |
| 10 | 62.5 | −73 | 15.7 | 0.027 |
| 11 | 61.9 | −74 | 17.2 | 0.068 |
| 12 | 60.0 | −71 | 15.7 | 0.000 |
| 13 | 57.9 | −70 | 17.2 | 0.068 |
| 14 | 56.5 | −74 | 18.0 | 0.068 |
| 15 | 55.0 | −71 | 17.0 | 0.068 |
| 16 | 52.4 | −69 | 18.0 | 0.000 |
| 17 | 50.0 | −69 | 21.0 | 0.000 |
| 18 | 45.0 | −60 | 22.5 | 0.000 |

Figure 10:
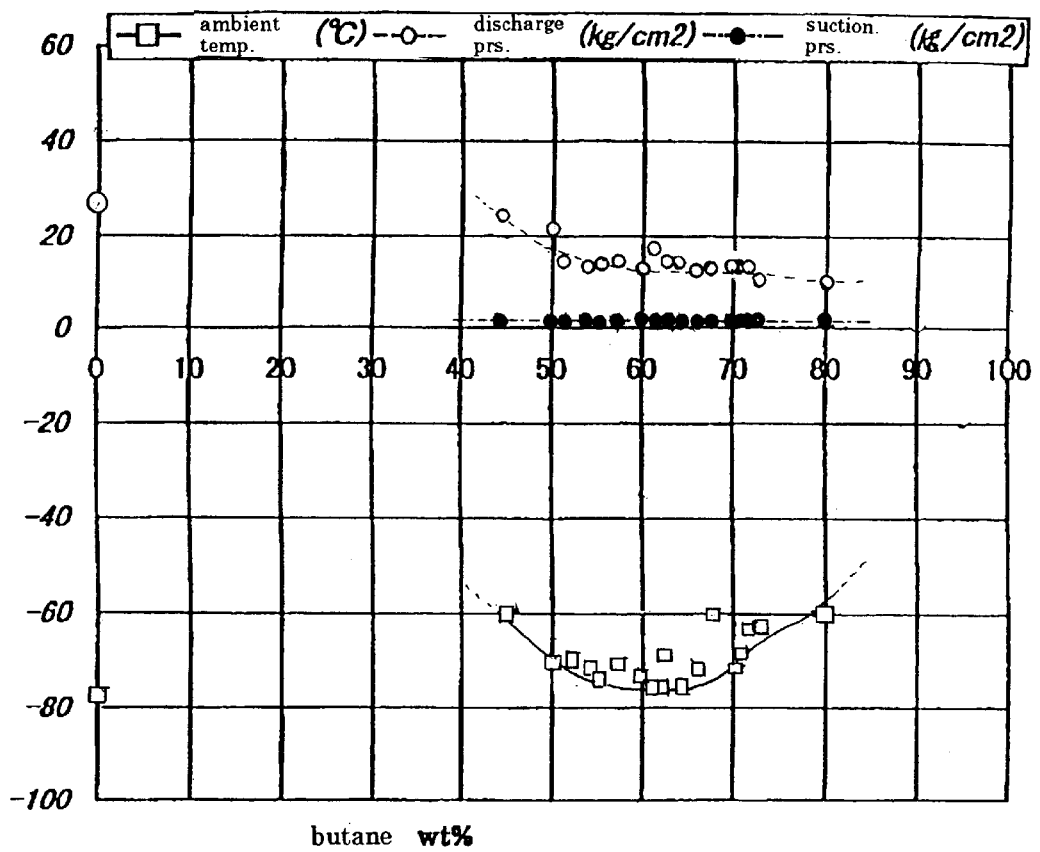
FIG. 10 is a graph showing the effect obtained upon sole addition of butane to a refrigerant consisting of R-116.

Note:
Room Temperature: 28° C.
Discharge Pressure: Gauge Pressure (kgf/cm$^2$)
Vacuum: Absolute Pressure (kgf/cm$^2$)
Total of Charged Gases: 200 to 240 g The results of Table 10 are also plotted in FIG. 10. In FIG. 10, for reference, the ambient temperature and discharge pressure of the refrigerant containing no (0 wt %) butane are plotted with reference to the boiling point and the vapor pressure at the room temperature of R-116.

As is appreciated from FIG. 10, when butane was mixed in a mixing ratio of 45% to 80% by weight and thus R-116 was mixed in a mixing ratio of 55% to 20% by weight, the ambient temperature could be maintained at −60° C. or less, and the refrigerating compressor could be operated at a discharge pressure of 12.5 to 21.0 kgf/cm$^2$ at an outlet of the compressor.

Industrial Applicability

As can be understood from the above detailed description, the refrigerant shows an ozone destruction capability of zero level and an inhibited warming-up effect of the earth, and therefore it can be utilized as alternative frons without causing any adverse effects on the environmental conditions.

Further, the refrigerant can be produced from R-23 and R-116 as well as propane and butane gases which are conventional fuels, at a low production cost. Also, the refrigerant can be easily and safely handled.

Furthermore, since the refrigerant material has specific properties, the refrigerant can be applied to conventional refrigeration rooms without modifying the construction of the room and without requiring a new refrigeration room to be installed therein such as a complicated high-power refrigerator unit especially designed for the present refrigerant. Furthermore, in such conventional refrigeration rooms, the refrigerant can attain an ultra-low temperature, in particular, an ambient temperature of less than −60° C. Moreover, refrigeration rooms which can be used in practice are available at very low cost because of their simple construction, and also can be easily maintained. It is therefore expected that the refrigerant can largely contribute on a wide variety of industries including food transportation industry biotechnology industry which has prospects of further development in future.

What we claim is:

1. A refrigerant for providing an ultra-low temperature, wherein said refrigerant comprises trifluoromethane (CHF$_3$), perfluoroethane (C$_2$F$_6$), and at least one or more members selected from propane and butane, wherein said trifluoromethane and said perfluoroethane are contained in a mixing ratio of 70% to 15% by weight of trifluoromethane, and 30% to 85% by weight of perfluoroethane, and said propane is included by an amount 55% to 95% by weight, said butane is included by an amount 50% to 90% by weight, or said mixture of propane and butane is included by an amount 35% to 70% by weight.

2. A refrigerant for providing an ultra-low temperature, wherein said refrigerant comprises trifluoromethane (CHF$_3$), perfluoroethane (C$_2$F$_6$), and at least one or more members selected from propane and butane, wherein said propane is included by an amount 55% to 95% by weight, said butane is included by an amount 50% to 90% by weight, or said mixture of propane and butane is included by an amount 35% to 70% by weight.

3. A refrigerant for providing an ultra-low temperature, in which said refrigerant comprises trifluoromethane (CHF$_3$), propane and butane, wherein said refrigerant comprises 60% to 15% by weight of trifluoromethane, 16% to 34% by weight of propane and 24% to 51% by weight of butane.

4. A refrigerant for providing an ultra-low temperature, in which said refrigerant comprises trifluoromethane (CHF$_3$) and butane, wherein said trifluoromethane (CHF$_3$) and butane are contained in a mixing ratio of 50% to 15% by weight of trifluoromethane and 50% to 85% by weight of butane.

5. A refrigerant for providing an ultra-low temperature, in which said refrigerant comprises perfluoroethane (C$_2$F$_6$), propane and butane, wherein said perfluoroethane (C$_2$F$_6$), propane and butane are contained in a mixing ratio of 60% to 20% by weight of perfluoroethane, 16% to 32% by weight of propane, and 24% to 48% by weight of butane.

6. A refrigerant for providing an ultra-low temperature, in which said refrigerant comprises perfluoroethane (C$_2$F$_6$) and butane.

7. The refrigerant according to claim 6, in which said refrigerant comprises 55% to 20% by weight of perfluoroethane and 45% to 80% by weight of butane.

* * * * *